Figure 1:
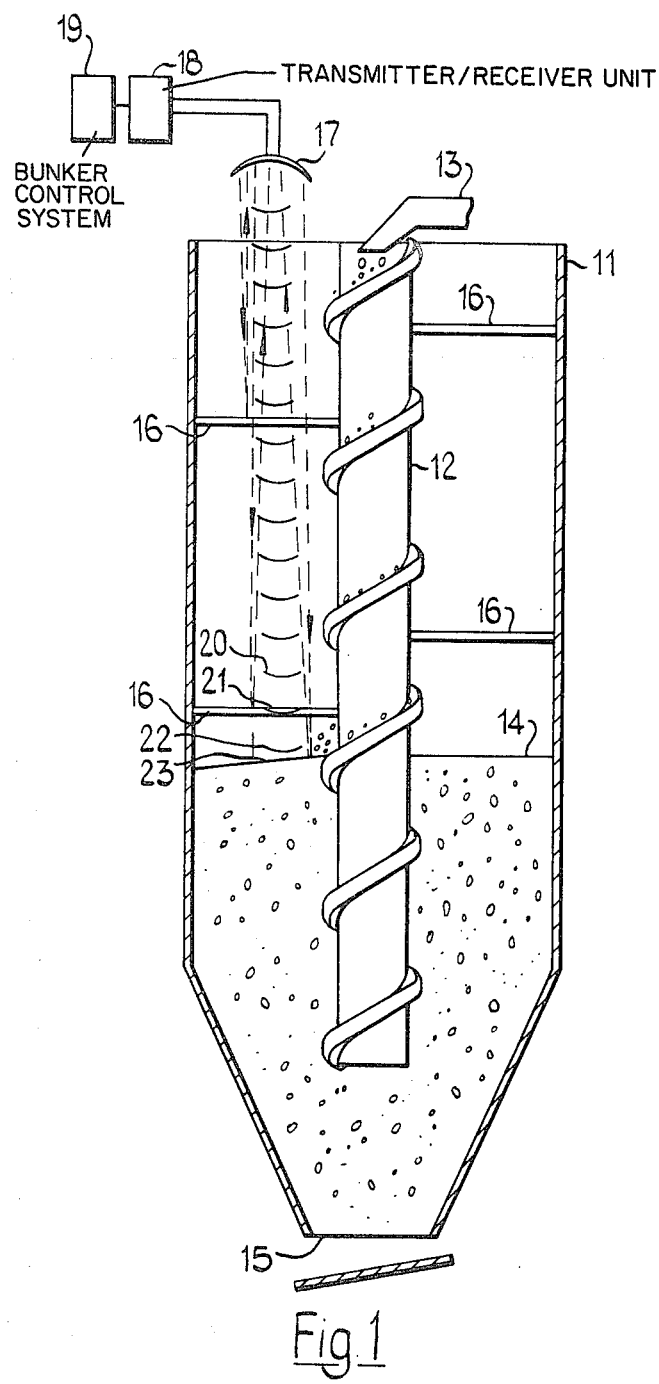

United States Patent [19]

Thompson

[11] 4,234,882
[45] Nov. 18, 1980

[54] METHOD AND APPARATUS FOR MEASUREMENT OF THE CONTENTS OF A BUNKER OR SILO

[75] Inventor: Lionel R. F. Thompson, Hatfield, England

[73] Assignee: Hawker Siddeley Dynamics Engr., Inc., Hatfield, England

[21] Appl. No.: 9,248

[22] Filed: Feb. 5, 1979

[30] Foreign Application Priority Data

Feb. 24, 1978 [GB] United Kingdom ............... 7436/78

[51] Int. Cl.³ ........................................... G01S 13/34
[52] U.S. Cl. ........................................................ 343/14
[58] Field of Search .......................................... 343/14

[56] References Cited

U.S. PATENT DOCUMENTS

| | | | |
|---|---|---|---|
| 3,727,897 | 4/1973 | Bennett | 343/12 R X |
| 3,730,628 | 5/1973 | Wolcott et al. | 343/14 X |
| 4,044,353 | 8/1977 | Levy | 343/14 X |
| 4,044,354 | 8/1977 | Bosher et al. | 343/14 |
| 4,044,355 | 8/1977 | Edvardsson | 343/14 |

*Primary Examiner*—Malcolm F. Hubler
*Attorney, Agent, or Firm*—Hall, Myers & Rose

[57] ABSTRACT

To measure the contents of a bunker or silo a transmitter mounted over the bunker beams down on to the contents surface a very high frequency signal that is caused repeatedly to rise and fall in frequency with either a constant sweep time and a progressively varying amplitude of frequency change or a constant amplitude and a progressively varying sweep time. The reflected target return signals are mixed with the transmitted signal to obtain a beat frequency which is filtered and processed to derive a signal representative of the range of the target, i.e. the contents surface, below the transmitter. To discriminate against target returns from fixed parts of the bunker structure, such as support members, a control unit is provided with a memory store into which are preloaded signals representative of fixed structure returns. The target returns received when the apparatus is in operation are then compared with the stored signals and any that are the same as stored signals are rejected. The control unit may also include a processor capable of distinguishing between returns from fixed targets and returns from a target moving toward or away from the transmitter.

7 Claims, 6 Drawing Figures

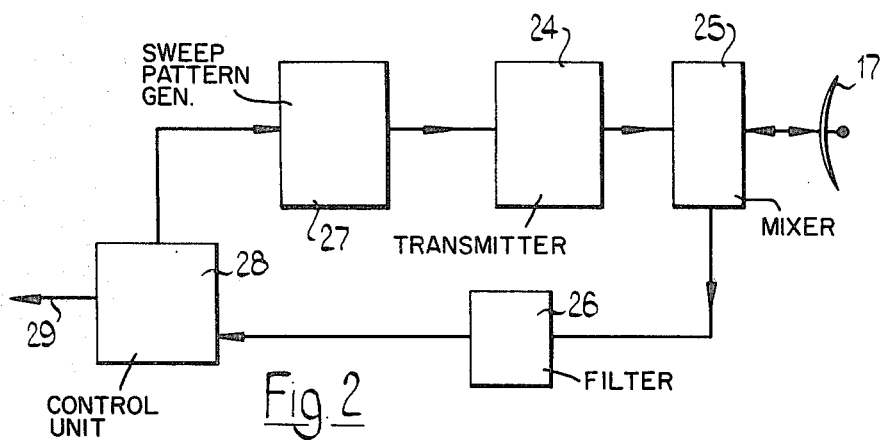
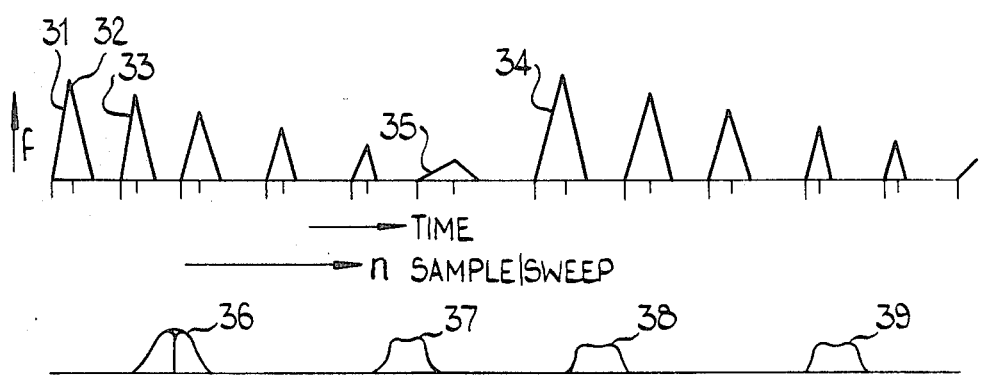

METHOD AND APPARATUS FOR MEASUREMENT OF THE CONTENTS OF A BUNKER OR SILO

This invention is concerned with the measurement of the amount of contents of a container such as a bunker by determining the distance of the surface of the contents from a fixed point.

Many methods have been employed for measuring bunker contents but all known methods to date have suffered from shortcomings which have made them unsuitable for use in certain applications. This invention is concerned with the provision of an instrument particularly, but not exclusively, for use in underground coal mines. In coal clearance systems of modern collieries it is essential to use very large bunkers as buffer stores in order to allow for smooth operation of the coal clearance system. In order for the system to be satisfactorily controlled it is necessary to have an indication of the contents of the bunker at all times. The bunkers referred to are often very large, having diameters up to 10 meters and depths up to 100 meters. Similar bunkers are used in other mineral and bulk handling situations and the invention described is applicable in these cases also.

Considerations of maintenance and reliability indicate that it is preferable that any bunker contents gauge be of the non-contact form and be mounted above the bunker. No part of the equipment should be within the bunker structure or in the area where the bunker contents can surround it.

According to the present invention, there is provided a method of measuring the contents of a bunker or silo, wherein a very high frequency signal is beamed down on to the surface of the bunker contents from above, the signal being modulated in frequency in such manner that the frequency repeatedly rises and falls with either a constant sweep time and a progressively changing amplitude or a constant amplitude and a progressively changing sweep time, target return signals reflected from the surface of the bunker contents being processed to determine the range of the surface below the transmitter according to the particular frequency sweep with which each target return is associated.

The invention further provides apparatus for performing this method comprising a transmitter mounted over the bunker to beam down on to the surface of the bunker contents a very high frequency signal, sweep generator means for modulating the transmitted signal to cause the frequency to rise and fall repeatedly with either a constant sweep time and a progressively changing amplitude or a constant amplitude and a progressively changing sweep time, and means receiving and processing reflected target signal returns from the bunker contents surface to deliver an output signal that represents the amount of the bunker contents in terms of the range of the contents surface below the transmitter as indicated by the particular frequency sweep of the transmitted signal with which each target return from the contents surface is associated.

Apparatus embodying the invention to be subsequently described has a number of specific features to make it suitable for use in a coal mine. It is to be understood, however, that the invention itself can be used in other applications where all the features to be described are not essential.

Another principle which appears to have desirable features for use in a bunker contents gauge is sonic echo sounding. The sonic echo sounder is known to work satisfactorily in bunkers to a depth of 25 meters. However, there are power limitations which prevent it being used satisfactorily in bunkers having a greater depth than 25 meters. The microwave (frequency modulated continuous wave) FMCW system does not have this shortcoming and it is this principle which is employed in the invention described herein.

Figure 4:
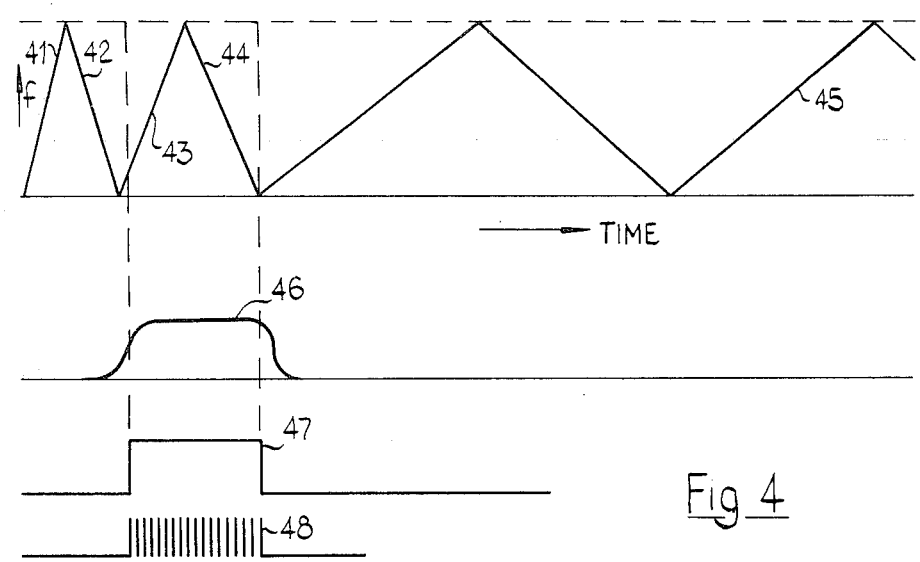
Figure 5:
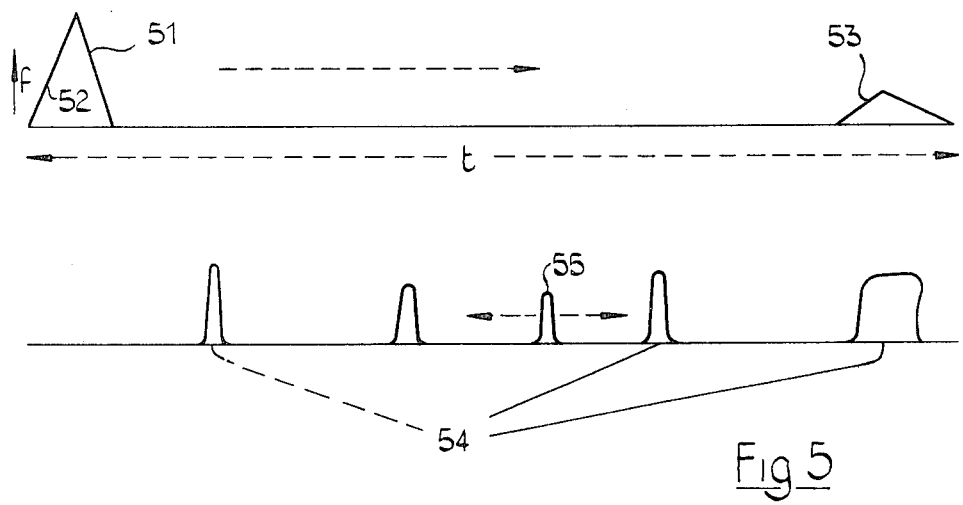
Figure 6:
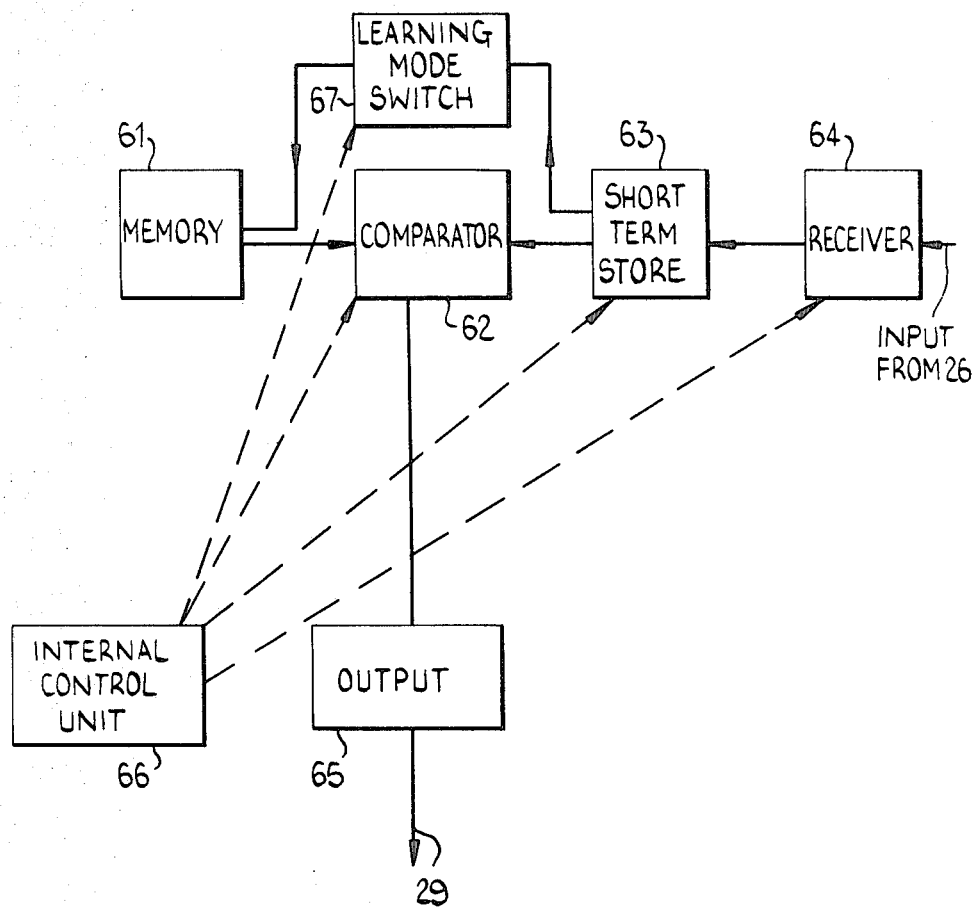

Some implementations of the invention are now described by way of example and with reference to the accompanying drawings, in which:

FIG. 1 is a diagram of apparatus according to the invention installed over a coal bunker, FIG. 2 is a block diagram of the instrument, FIG. 3 is a waveform diagram illustrating one operating principle of the instrument, FIG. 4 is a waveform diagram illustrating another operating principle of the instrument, FIG. 5 is a waveform diagram used in explanation of how discrimination is effected between required target signals and fixed structure signals, and FIG. 6 is a block diagram of means for effecting such discrimination.

FIG. 1 shows a typical bunker installation where an instrument embodying this invention can be applied. The bunker 11 typically may be 10 meters diameter, and 100 meters deep, and may just be a vertical shaft in the ground. Some bunkers have a spiral chute feed assembly 12 installed down the centre line such that material being fed into the bunker via the chute entry 13 is not allowed to pick up significant kinetic energy as it enters the bunker. The chute allows the material to spread on to the surface level 14 in the bunker at whatever height it happens to be. The bunker has an exit 15 at the bottom which is controlled to allow material to leave the bunker as required. The spiral chute is often supported by members 16 across the bunker at various levels in the bunker.

The antenna 17 of the microwave instrument described in this specification is shown at the top of the bunker fed from a transmitter/receiver unit 18 which in turn is controlled by the bunker control system 19. High frequency signals indicated diagrammatically at 20 and 22 and controlled at varying frequency are radiated by the antenna 17. Reflections from the support structure 16 are represented by location 21 sending back signals to the antenna 17. There may be many such reflections from different parts of the structure. However, these will remain fixed with respect to time. Reflections from the coal surface at location 23 within the bunker 14 are also sent back to the antenna 17. These signals indicative of the coal level will change with time as the bunker empties and fills. It is one of the purposes of the apparatus to discriminate between the signals from the moving surface and those from fixed parts of the structure.

FIG. 2 shows a simplified block diagram of the instrument. A transmitter 24 operating at very high frequencies of the order of 10 GHz and modulated in frequency with respect to time feeds signals to a mixer unit 25 and so to the antenna 17. Signals transmitted are collimated by the antenna to form a narrow beam which can be of the order of 3 degrees spread. Alternatively, a horn or other shaped antenna can be used having a polar diagram of transmission which is appropriate to the size of the bunker over which the instrument is mounted. Reflection signals are collected by the same antenna, or in some circumstances by a separate adjacent antenna, and fed back to the mixer 25. In the mixer the beat frequency which is generated by the mixing of the transmitter signal and the delayed received signal is fed to a filter 26. The bandwidth and the centre frequency of this filter is determined by the characteristics of a sweep pattern generator 27, the rate of change of the sweep signal and the required resolution of target distance. The output from the filter 26 is fed to a control unit 28. A signal generated in the control unit 28 is fed to the sweep pattern generator 27 which controls the variation of the transmitted frequency with time. A computation determined by the signal from the filter 26 and the transmitted signal generated by the transmitter 24 allows the distance of the target surface from the antenna to be deduced, and an output signal indicative of this target distance is fed out via connection 29.

A system, according to the above description, has the characteristics described by the formula:

$$R = (\tau C/2) fr (1/\Delta F)$$

Where R = the range of the target surface from the antenna.

$\tau$ is the measured time of the swept frequency

C is equal to the velocity of light ($3 \times 10^8$ meters per second).

fr is the centre frequency of the filter 26

$\Delta F$ is the frequency deviation of the swept frequency (that is, the range of the freqency shift of the high frequency carrier during the sweep).

Inspection of this formula will show that if fr and $\Delta F$ are constant then the target range is proportional to $\tau$. If $\tau$ and fr are constant then the range is inversely proportional to $\Delta F$. Both these factors are used in different implementations of the invention.

The second approach is illustrated in diagrammatic form in FIG. 3. The upper waveform diagram shows how the frequency f of the carrier is varied with time to give cover of a range, say, from 3 meters to 100 meters for the target surface. At point 31, the frequency is rising say, by way of example, from 13.2 GHz to 13.575 GHz in 1 millisecond. At point 32 the frequency is linearly returning to its initial value of 13.2 GHz in a further 1 millisecond. The next frequency sweep shown at 33 takes the same period of, say, 1 millisecond but the amplitude of the frequency change is reduced. That is the rate of change of frequency is less than in the first sweep indicated at 31. As time progresses more frequency sweeps are generated, each one having a slightly less rate of change of signal. The difference between the rates of change of frequency of successive sweeps will be small and be determined by the bandwidth of the filter 26 shown in FIG. 2. In a practical system it is likely there will be more than 500 such different sweeps or samples in one overall cycle of the system. The first sweep 31 is associated with any target at the minimum range and the last sweep 35, having the least rate of change of frequency, is associated with the target at the maximum distance catered for by the system. Once the whole cycle has been completed it is repeated and the signal at point 34 is a repeat of the signal at point 31. It will be understood that each one of these frequency sweeps is associated with a potential target at a different distance. By appropriately choosing the difference between the rates of change of frequency of adjacent samples it is possible to determine the resolution of the instrument. In a particular example, if the shift of frequency at point 31 is 375 MHz and the period of frequency increase is 1 millisecond and if the centre frequency of the filter 26 is 7.5 KHz, and the ultimate (lowest rate of change) sweep covers a range of 11.25 MHz in a period of 1 millisecond, then the range of possible targets for the instrument will be 3 meters to 100 meters.

The lower waveform signals 36, 37 shown in FIG. 3, are representative of the output of filter 26 in FIG. 2 when the particular range associated with a specific sweep rate happens to coincide with a particular target. Signals 38 and 39 are repetitions of the same signals in the next major cycle. It is to be understood that the swept frequency signals can be triangular as indicated, or alternatively, they can be of a saw tooth shape whereby the return to the lower frequency is virtually instantaneous. The former method is preferably since it reduces the number of side bands generated in the transmitter. The swept frequency signals can be as shown with time delays between them into which can be inserted calibration signals, if required. Alternatively, the swept frequency can be repeated with no time delay.

FIG. 4 is indicative of the other method resulting from examination of the equation for the instrument described above. Here, in the upper waveform, signals 41, 43 and 45 show different rates of change of swept frequency where the amplitude of frequency change is constant. It will be seen here that the time taken to carry out the sweep increases as the rate of change reduces. Again the return to the nominal frequency 42 can be linear and an image of the rising frequency. Return sweep 42 is associated with rising sweep 41. Alternatively, a saw-tooth waveform can be used, or there can be time spaces between successive sweeps. The waveform 46 of FIG. 4 shows the output from the filter 26 of FIG. 2 which is generated by the swept frequency 43 when there is a target to give rise to a signal from the filter. The square waveform 47 is generated from the waveform 46 and the time duration of signal 47 is representative of the distance of the related target. The time duration of this pulse 47 can be measured by counting pulses 48 from a high frequency clock which are switched on and off at the beginning and end of the pulse. The count obtained will be indicative of the range of the associated target.

It will be understood that any targets detected in the bunker will give rise to reflections and signals from the filter 26 in FIG. 2 each one of which will be associated with a particular swept frequency rate. Thus the distance of each target detected can be determined. By way of example, if the swept frequency range is 375 MHz in each case, then if the frequency sweep 41 takes 10 microseconds and at the other end of the range of frequency sweep 45 takes 1 millisecond, the total span of range of the instrument will be from 1 meter to 100 meters. In this case, the centre frequency of the filter 26 in FIG. 2 will be 250 KHz. It will be understood that FIG. 4 is only diagrammatic and that there will be a very large number of samples of swept frequency between that associated with the minimum distance target and that associated with the maximum distance target. Preferably, the difference between the slopes of the successive sweeps will not exceed 1 percent of the slope.

FIG. 5 is indicative of how computer means can be employed to differentiate between the required target, that is the moving surface of the material in the bunker, and the returns obtained from the fixed structure. The upper waveform 51 shows one cycle of a total sweep series. The sweep associated with the minimum target range is shown at 52 and the sweep associated with the maximum target range is shown at 53. All possible targets are encompassed in the time t between two signals. Providing the bandwidth of the filter 26 in FIG. 2 is chosen suitably all possible targets will be detected during the overall sweep cycle. In the lower waveform, signals 54 representative of outputs of the filter 26 in FIG. 2 are returns from fixed targets, i.e. the structure of the bunker. These will not move with time although those at the greater range may well be missing if the level of the material in the bunker obstructs them. Signal 55 from the filter 26 in FIG. 2 is representative of the target signal from the surface of the material in the bunker and this will move with time if the bunker is emptying or filling. By a learning process the positions of the fixed signals can be determined and held in the memory of the controller 28 in FIG. 2 in a way such that outputs are not given for these signals. By way of example, a particular return is compared with the memory of controller 28. If this is equal to a signal held in the memory representative of a structure return then the output signal is inhibited. The true return from the moving target, which is required, is not so inhibited. The true target may be obscured when it is at the same range as a fixed structure target. However, this anomaly can be overcome by tracking the movement of the surface of the material and using credibility techniques predicting that it cannot move faster than a certain predetermined rate. In such a case then the output signal from the instrument will be retained even though it is equal to the range of a fixed structure target. It will be well understood by those skilled in the art that such a method can be implemented using digital computer techniques and that furthermore the availability of microcomputers makes this an economic proposition.

For further understanding of the way in which the control unit 28 in FIG. 2 may be implemented a more detailed diagram is given in FIG. 6 showing a possible implementation. The input from the filter 26 is collected by a receiver 64 where it is conditioned to be fed into a short term memory store 63. In this short term memory store the information from the filter 26 will be held in digital form. The information concerning the position of the static part of the bunker will be held in digital form in a memory 61. Information in the short term store 63 is compared with the information in memory 61 by comparator 62. Only that information concerned with the required target, thus is the surface of the material in the bunker, is supplied to the output unit 65 and so to the output 29. All the functional units within this control unit are organised by an internal control unit 66 which may be constructed employing a microprocessor, although other methods of digital control can be employed. In order to load the memory 61 with the information concerning the fixed parts of the structure a learning mode switch means 67 can be closed, again under the control of the internal control unit 66. To load the memory 61 the instrument is operated preferably with the bunker empty. All target returns obtained in these circumstances will be fixed structure returns. Thus the information repetitively residing in the short term memory store 63 can be relocated in the memory 61 to be used later when material is fed into the bunker.

It is not essential that the memory means 61 be loaded in this fashion. It would be possible for this information to be collected, in a longer time, by using the capability of the processor in the internal control unit 66 to determine those target returns which are static. It is these returns which will then be held in the memory means 61.

I claim:

1. Apparatus for measuring the contents of a bunker or silo, comprising a transmitter mounted over the bunker to beam down on to the surface of the bunker contents a very high frequency signal, sweep generator means for modulating the transmitted signal to cause the frequency to rise and fall repeatedly with either a constant sweep time and a progressively changing amplitude or a constant amplitude and a progressively changing sweep time, a mixer responsive to both the transmitted signal and the target signal returns to deliver a beat frequency, a filter for said beat frequency, a control unit receiving the filtered beat frequency, said control unit both controlling the sweep generator means and also computing from the filtered beat frequency the distance of the bunker contents surface below the transmitter as indicated by the particular frequency sweep of the transmitted signal with which each target return from the contents surface is associated, said control unit including means for discriminating against target signal returns from fixed structure of the bunker which discriminating means comprises a long-term memory store for pre-storing signals corresponding to signal returns from fixed structure of the bunker, a short-term memory store for receiving the incoming filtered beat frequency signals, and comparator means for comparing the incoming beat frequency signals in the short-term store with the pre-stored signals in the long-term store and rejecting any of the incoming beat frequency signals that corresponds to a pre-stored signal.

2. Apparatus according to claim 1, wherein the control unit includes processing means arranged to distinguish between incoming signals derived from target returns from fixed targets and those derived from a moving target moving toward or away from the transmitter.

3. Apparatus according to claim 1, including a learning mode switch operable to enable signals appearing in the short term memory to be loaded into the long term memory, so that signals representing returns from fixed structure can be pre-stored by performing one or more operating cycles of the apparatus with the bunker empty.

4. Apparatus according to claim 2 or claim 3 or claim 1, wherein the waveform of the transmitted modulated frequency signal is triangular or sawtooth with time delays between successive frequency sweeps.

5. Apparatus according to claim 2 or claim 3 or claim 1, wherein the waveform of the transmitted modulated frequency signal is triangular or sawtooth with no time delays between successive frequency sweeps.

6. Apparatus for measuring the contents of a bunker or silo, comprising a transmitter mounted over the bunker to beam down onto the surface of the bunker contents a very high frequency signal, cyclically-operating sweep generator means for modulating the transmitted signal to cause the frequency to rise and fall in a multiplicity of sweeps per cycle, the successive sweeps in each cycle having a constant sweep time and a progressively decreasing rate of change of frequency, said successive sweeps corresponding to progressively increasing target distances, a mixer responsive to both the transmitted signal and the target signal returns to deliver a beat frequency, a filter for said beat frequency, a control unit receiving the filtered beat frequency, said control unit both controlling the sweep generator means and also computing from the filtered beat frequency the distance of the bunker contents surface below the transmitter as indicated by the particular frequency sweep of the transmitted signal with which each target return from the contents surface is associated, said control unit including means for discriminating against target signal returns from fixed structure of the bunker which discriminating means comprises a long-term memory store for pre-storing signals corresponding to signal returns from fixed structure of the bunker, a short-term memory store for receiving the incoming filtered beat-frequency signals, and comparator means for comparing the incoming beat frequency signals in the short-term store with the pre-stored signals in the long-term store and rejecting any of the incoming beat frequency signals that corresponds to a pre-stored signal.

7. Apparatus for measuring the contents of a bunker or silo, comprising a transmitter mounted over the bunker to beam down onto the surface of the bunker contents a very high frequency signal, cyclically-operating sweep generator means for modulating the transmitted signal to cause the frequency to rise and fall in a multiplicity of sweeps per cycle, the successive sweeps in each cycle having a constant amplitude of frequency change and a progressively decreasing rate of change of frequency, said successive sweeps corresponding to progressively increasing target distances, a mixer responsive to both the transmitted signal and the target signal returns to deliver a beat frequency, a filter for said beat frequency, a control unit receiving the filtered beat frequency, said control unit both controlling the sweep generator means and also computing from the filtered beat frequency the distance of the bunker contents surface below the transmitter as indicated by the particular frequency sweep of the transmitted signal with which each target return from the contents surface is associated, said control unit including means for discriminating against target signal returns from fixed structure of the bunker which discriminating means comprises a long-term memory store for pre-storing signals corresponding to signal returns from fixed structure of the bunker, a short-term memory store for receiving the incoming filtered beat frequency signals, and comparator means for comparing the incoming beat frequency signals in the short-term store with the pre-stored signals in the long-term store and rejecting any of the incoming beat frequency signals that corresponds to a pre-stored signal.

* * * * *